United States Patent [19]
Takatori

[11] Patent Number: 5,534,757
[45] Date of Patent: Jul. 9, 1996

[54] AMPLIFYING CIRCUIT FOR DYNAMIC FOCUS

[75] Inventor: Masahiro Takatori, Toyonaka, Japan

[73] Assignee: Matsushita Electric Industrial Co., Ltd., Osaka, Japan

[21] Appl. No.: 329,279

[22] Filed: Oct. 26, 1994

[30] Foreign Application Priority Data

Oct. 28, 1993 [JP] Japan ................................. 5-270614

[51] Int. Cl.$^6$ ................................................. G09G 1/04
[52] U.S. Cl. ............................................. 315/382; 315/387
[58] Field of Search ............................. 315/382, 382.1, 315/387, 389; 348/806, 326

[56] References Cited

U.S. PATENT DOCUMENTS

| | | | |
|---|---|---|---|
| 4,555,649 | 11/1985 | Sharma | 315/382 |
| 5,146,142 | 9/1992 | Van Tol | 315/382 |
| 5,331,256 | 7/1994 | Ogino et al. | 315/382 |

FOREIGN PATENT DOCUMENTS 1061174  3/1989  Japan .

OTHER PUBLICATIONS

IBM Technical Disclosure Bulletin, "Dynamic Dynamic Focusing Circuit for High Resolution Display Monitor", vol. 31, No. 2, Jul. 1988.

European Search Report dated Jan. 27, 1995.

*Primary Examiner*—Gregory C. Issing
*Attorney, Agent, or Firm*—Ratner & Prestia

[57] ABSTRACT

An amplifying circuit for dynamic focus of the invention applies, in a DC feedback loop of amplifying circuit for horizontal dynamic focus, a parabolic waveform signal for correction of vertical dynamic focus to a non-inverting input terminal or inverting input terminal of a detection amplifier for DC feedback, or to an input terminal of a DC control circuit, and superposes on a parabolic waveform signal for correction of horizontal dynamic focus in an amplifying circuit for horizontal dynamic focus through the DC control circuit, thereby stabilizing the DC action point in the amplifying circuit for horizontal dynamic focus, and also obtaining the parabolic waveform signal for correction of horizontal dynamic focus superposing the parabolic waveform signal for correction of vertical dynamic focus from the output terminal of the amplifying circuit for horizontal dynamic focus. Therefore, the amplifying circuit for vertical dynamic focus required in the prior art is not necessary, and hence the circuit may be simplified.

Moreover, it is free from distortion of waveform, as experienced in the prior art, when adding after individually amplifying the parabolic waveform signal for correction of horizontal dynamic focus and parabolic waveform signal for correction of vertical dynamic focus, and therefore the distortion can be kept low as compared with the prior art.

6 Claims, 4 Drawing Sheets

5,534,757

AMPLIFYING CIRCUIT FOR DYNAMIC FOCUS

BACKGROUND OF THE INVENTION

The present invention relates to an amplifying circuit for dynamic focus for correcting dynamic focus of television receiver or CRT monitor using a cathode-ray tube.

In a television receiver, or CRT monitor, recently, the surface of the cathode-ray tube tends to be flat. At the same time, as the definition is becoming higher, the scanning becomes faster. In this situation, a higher definition of the screen is strongly demanded.

At the present, therefore, dynamic focus correction is standard in the television receiver or CRT monitor using a cathode-ray tube.

Conventional amplifying circuits for dynamic focus are described below. FIG. 7 is a block diagram of an amplifying circuit for dynamic focus in a prior art. FIG. 8 is a circuit diagram showing a practical circuit of the amplifying circuit for dynamic focus in the prior art.

In FIG. 7, an amplifying circuit 71 for horizontal dynamic focus receives, amplifies, and delivers a parabolic waveform signal for horizontal dynamic focus correction synchronized with a horizontal sync signal.

In a detection amplifier 72 for DC feedback, the output of the amplifying circuit 71 for horizontal dynamic focus is divided by using two series resistors, and entered in a non-inverting input terminal, and horizontal parabolic components are filtered by connecting a capacitor between this dividing point and the ground. On the other hand, a supply voltage +VL is divided by two series resistors, and entered in an inverting input terminal, and is connected to the ground through a capacitor from this dividing point. A differential voltage between the non-inverting input terminal and inverting input terminal is amplified, and is delivered to a DC control circuit 73.

In the DC control circuit 73, by the output from the detecting amplifier 72 for DC feedback, the DC action point of the amplifying circuit 71 for horizontal dynamic focus is controlled.

In this constitution, a DC feedback loop is constructed in order to deliver output voltage without distortion by stabilizing the DC action point of the amplifying circuit 71 for horizontal dynamic focus.

To an amplifying circuit 74 for vertical dynamic focus, consequently, a parabolic waveform signal for correcting the vertical dynamic focus synchronized with the vertical sync signal is entered and amplified, and its output voltage is applied to a coupling point of a resistor and a grounded capacitor, after the output voltage of the amplifying circuit 71 for horizontal dynamic focus passes through the capacitor for AC coupling, that is, the point of passing the low pass filter for filtering the parabolic waveform signal for correction of horizontal dynamic focus. To the parabolic waveform signal for correction of horizontal dynamic focus, the parabolic waveform signal for correction of vertical dynamic focus is added and superposed, and is applied to a grid for dynamic focus of cathode-ray tube which is not shown in the drawing.

Referring to FIG. 8, a practical circuit of amplifying circuit for dynamic focus of prior art is described. Same functional parts as in FIG. 7 are identified with same reference numerals, and explanations are omitted.

In FIG. 8, the amplifying circuit 71 for horizontal dynamic focus is mainly composed of transistors Q81, Q82, Q83, Q84, Q85. A parabolic waveform for correction of horizontal dynamic focus is entered to the base of the transistor Q83. A specific voltage VB is entered to the base of the transistor Q82. The collector of the transistor Q83 is connected to the emitter of the transistor Q82, and a cascade connection type amplifying circuit is composed. The load of the cascade type amplifying circuit is the transistor Q81 connected to the collector of the transistor Q82. The parabolic waveform signal for correction of horizontal dynamic focus amplified in this cascade type amplifying circuit is delivered from the collector of the transistor Q82, and is fed into the bases of the transistors Q84, Q85 in emitter-follower configuration for lowering the output impedance, and is delivered from combined emitters. The constitution around the detection amplifier 72 for DC feedback is same as described in FIG. 7.

The DC control circuit 73 is constructed around a transistor Q86. The output voltage of the detection amplifier 72 for DC feedback is divided by two series resistors, and is entered into the base of a transistor Q86 from the connection point of two resistors. The collector of the transistor Q86 is connected to the emitter of the transistor Q83, the collector current of the transistor Q86 is controlled by the output voltage of the detection amplifier 72 for DC feedback, and the action point of a cascade type amplifying circuit composed of transistors Q82 and Q83 is controlled by this collector current, thereby controlling the DC action point of the amplifying circuit 71 for horizontal dynamic focus.

In this constitution, a DC feedback loop is composed in order to deliver an output voltage without distortion by stabilizing the DC action point by control of the DC action point of the amplifying circuit 71 for horizontal dynamic focus.

The amplifying circuit 74 for vertical dynamic focus is composed around a transistor Q87, and a parabolic waveform signal for correction of vertical dynamic focus is entered in the base of the transistor Q87, and amplified and delivered. The output signal of The transistor Q87 which is the output of this amplifying circuit 74 for vertical dynamic focus is connected to the point passing through a capacitor for AC coupling and low pass filter from the emitters of the transistors Q84, Q85 which are the output stage of the amplifying circuit 71 for horizontal dynamic focus, and a parabolic waveform signal for correction of horizontal dynamic focus which is the output of the amplifying circuit 71 for horizontal dynamic focus, and a parabolic waveform signal for correction of vertical dynamic focus which is the output of the amplifying circuit 74 for vertical dynamic focus are added and superposed, and delivered to a grid for dynamic focus of a cathode-ray tube.

In such conventional constitution, in addition to the problem in circuit configuration that the amplifying circuit 74 for vertical dynamic focus is necessary, since the parabolic waveform signal for correction of horizontal dynamic focus and parabolic waveform signal for correction of vertical dynamic focus are amplified and added in a high voltage state of hundreds of volts, in FIG. 8 the output circuit of low output impedance of the amplifying circuit 71 for horizontal dynamic focus is a load for the amplifying circuit 74 for vertical dynamic focus. and the low pass filter is a load for the amplifying circuit 74 for vertical dynamic focus, and hence the waveform distortion is large when adding.

SUMMARY OF THE INVENTION

A first constitution of an amplifying circuit for dynamic focus comprises an amplifying circuit for horizontal dynamic focus for receiving a parabolic waveform signal for correction of horizontal dynamic focus, amplifying and delivering to a grid for dynamic focus of a cathode-ray tube, a detection amplifier for DC feedback for dividing the output of the amplifying circuit for horizontal dynamic focus by using resistors, filtering the horizontal parabolic waveform signal component by connecting a first capacitor between the dividing point and the ground, and amplifying and delivering the differential voltage by receiving the voltage at the dividing point by adding the parabolic waveform signal for correction of vertical dynamic focus correction through a second capacitor to the dividing point, and a specific voltage, and a DC control circuit for controlling a DC action point of the amplifying circuit for horizontal dynamic focus by receiving the output voltage of the detection amplifier of DC feedback.

A second constitution comprises a detection amplifier for DC feedback for dividing the output of an amplifying circuit for horizontal dynamic focus by using resistors, receiving a voltage at the dividing point filtering a horizontal parabolic waveform signal component by connecting a first capacitor between the dividing point and the ground, and a voltage by adding a parabolic waveform signal for correction of vertical dynamic focus through a second capacitor to a specific DC voltage, and amplifying and delivering the differential voltage thereof, in which the output voltage of the detection amplifier for DC feedback is entered in a DC control circuit, and a DC action point of the amplifying circuit for horizontal dynamic action is controlled.

A third constitution is characterized by dividing the output of an amplifying circuit for horizontal dynamic focus by using resistors, entering a voltage at the dividing point filtering a horizontal parabolic waveform signal component by connecting a first capacitor between the dividing point and the ground, and a specific DC voltage, and amplifying and delivering the differential voltage thereof by a detection amplifier for DC feedback, adding, to its output voltage, a parabolic waveform signal for correction of vertical dynamic focus through a second capacitor, entering the sum voltage to a DC control circuit, and controlling a DC action point of an amplifying circuit for horizontal dynamic signal by this DC control circuit.

In this constitution of the invention, by adding a parabolic waveform signal for correction of vertical dynamic focus to a DC feedback of amplifying circuit for horizontal dynamic focus, a parabolic waveform signal for correction of vertical dynamic focus can be superposed on a parabolic waveform signal for correction of horizontal dynamic focus in the amplifying circuit for horizontal dynamic focus through a DC control circuit, and the output is delivered.

Hence, the parabolic waveform signal amplifying circuit for correction of vertical dynamic focus is not necessary, and the parabolic waveform signal for correction of vertical dynamic focus is added at a low voltage level, so that the distortion in the prior art does not occur.

DETAILED DESCRIPTION OF THE PREFERRED EMBODIMENTS (Embodiment 1)

Figure 1:
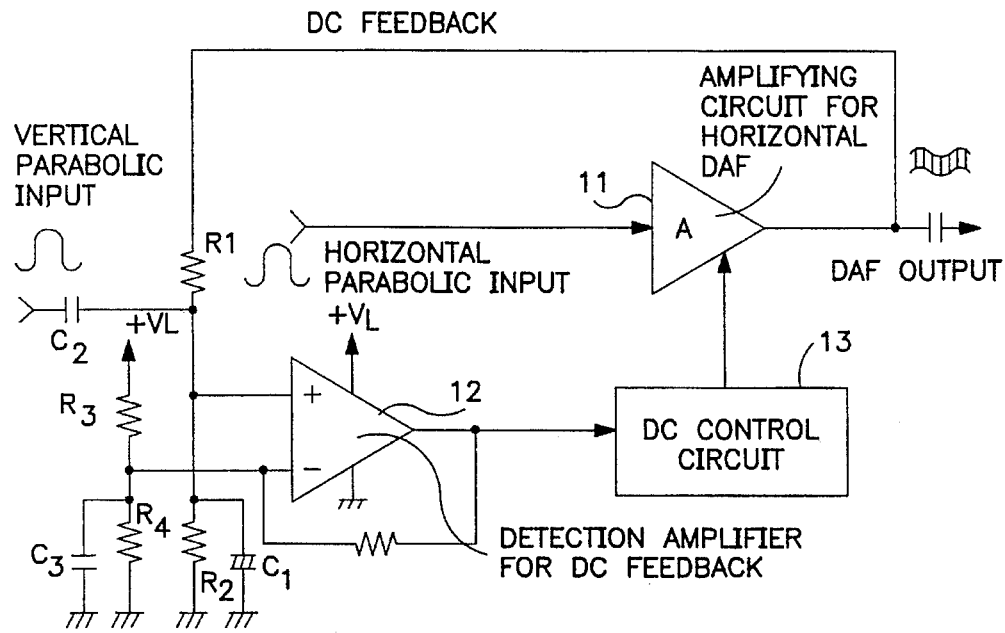
FIG. 1 is a block diagram showing the constitution of an amplifying circuit for dynamic focus in a first embodiment of the invention.
Figure 2:
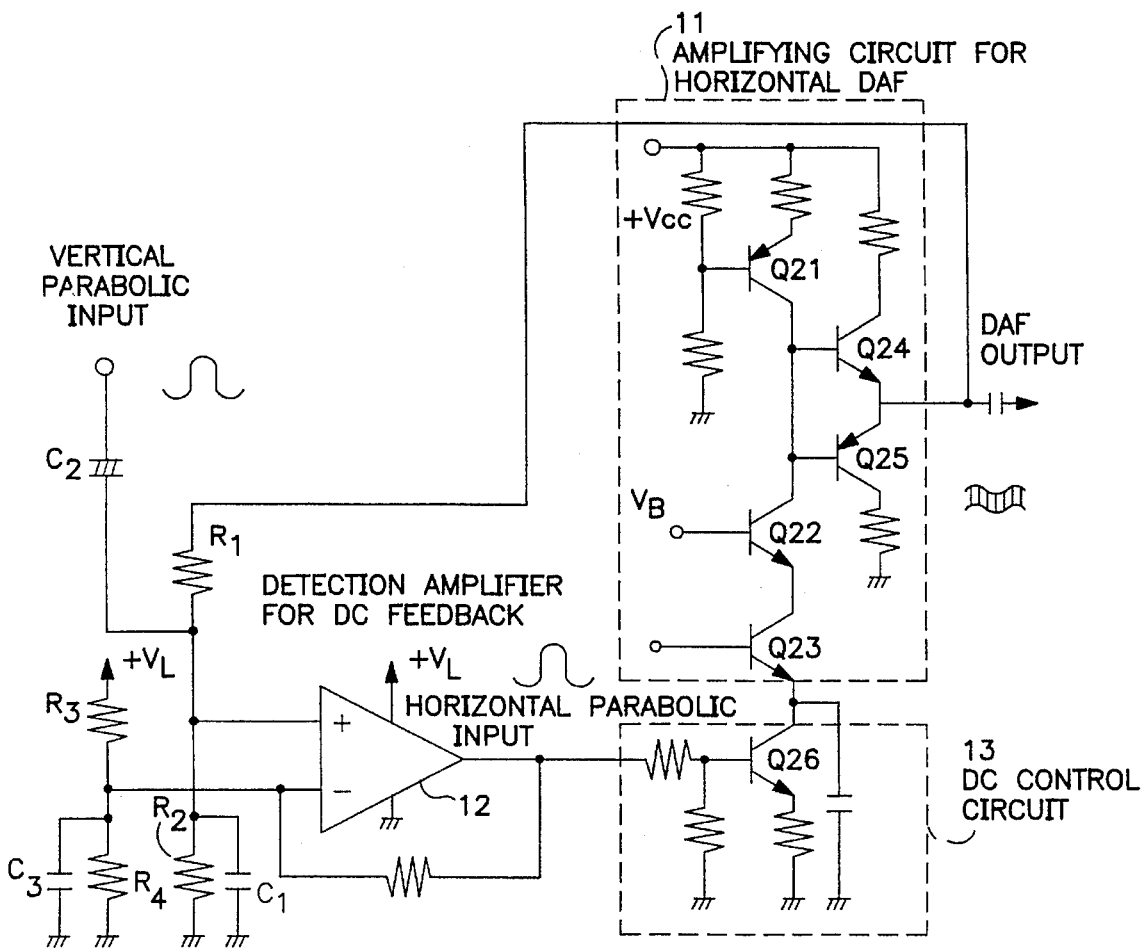
FIG. 2 is a circuit diagram showing a specific circuit constitution of the amplifying circuit for dynamic focus in the first embodiment of the invention.

An amplifying circuit for dynamic focus in a first embodiment of the invention is described below by reference to the accompanying drawings. FIG. 1 is a block diagram showing the constitution of the first embodiment of the invention. FIG. 2 is a circuit diagram showing a practical circuit of the first embodiment.

In FIG. 1, an amplifying circuit 11 for horizontal dynamic focus receives, amplifies, and delivers a parabolic waveform signal for correction of horizontal dynamic focus.

A detection amplifier 12 for DC feedback enters the voltage having the output of the amplifying circuit 11 for horizontal dynamic focus divided by two series resistors R1, R2, into a non-inverting input terminal, and filters a horizontal parabolic waveform signal component by connecting a first capacitor C1 between the dividing point and the ground. To this dividing point, that is, the non-inverting input terminal of the detection amplifier 12 for DC feedback, a parabolic waveform signal for correction of vertical dynamic focus is added through a second capacitor C2.

On the other hand, the voltage having a supply voltage +VL divided by two series resistors R3, R4 is entered into an inverting input terminal from the dividing point, and is connected to the ground from the dividing point through a capacitor C3. The differential voltage between the non-inverting input terminal and inverting input terminal is amplified, and delivered to a DC control circuit 13.

The DC control circuit 13 controls the DC action point of the amplifying circuit 11 for horizontal dynamic focus by the output from the detection amplifier 12 for DC feedback. In this constitution, the DC action point of the amplifying circuit 11 for horizontal dynamic focus is stabilized, while a parabolic waveform signal for correction of vertical dynamic focus is applied to a DC feedback loop of the amplifying circuit 11 for horizontal dynamic focus to superpose on a parabolic waveform signal for correction of horizontal dynamic focus in the amplifying circuit 11 for horizontal dynamic focus through the DC control circuit 13, thereby obtaining a signal output superposing the parabolic waveform signal for correction of vertical dynamic focus and the parabolic waveform signal for correction horizontal dynamic focus from the output terminal of the amplifying circuit 11 for horizontal dynamic focus, and this output signal is added to a grid for dynamic focus of a cathode-ray tube which is not shown in the drawing.

Referring now to FIG. 2, a practical circuit of the amplifying circuit for dynamic focus in the first embodiment of the invention is described. In FIG. 2, components with same reference numerals as in FIG. 1 denote constituent elements of same functions. The amplifying circuit 11 for horizontal dynamic focus is mainly composed of transistors Q21, Q22, Q23, Q24, and Q25. A parabolic waveform signal for correction of horizontal dynamic focus is entered in the base of the transistor Q23. A specific voltage VB is entered in the base of the transistor Q22. The collector of the transistor Q23 is connected to the emitter of the transistor Q22, and a cascade type amplifying circuit is composed. The load of this cascade type amplifying circuit is the transistor Q21 connected to the collector of the transistor Q22. The parabolic waveform signal for correction of horizontal dynamic focus amplified in this cascade type amplifying circuit is delivered from the collector of the transistor Q22, and is entered in the bases of the transistors Q24 and Q25 in emitter-follower configuration to lower the output impedance, and produced from the combined emitters.

DC voltages of emitter outputs of the transistors Q24, Q25 of the amplifying circuit 11 for horizontal dynamic focus are divided by two series resistors R1, R2, and the parabolic waveform signal component for correction of horizontal dynamic focus is filtered by connecting a capacitor C1 from this dividing point or the junction point of the resistors to the ground. At the same time, to this dividing point, a parabolic waveform signal for correction of vertical dynamic focus is applied through a capacitor C2, this dividing point is entered in a non-inverting input terminal of a detection amplifier 22 for DC feedback, and a supply voltage +YL is divided by two series resistors R3. R4, and the divided voltage is entered from the dividing point to an inverting input terminal, and is connected to the ground from the dividing point through a capacitor C3. A differential voltage of the non-inverting input terminal and inverting input terminal is amplified, and delivered to a DC control circuit 13.

The DC control circuit 13 is composed around a transistor Q26, and the output voltage from the detection amplifier 12 for DC feedback is divided by two series resistors, and is entered into the base of the transistor Q26 from its intermediate junction point. The collector of the transistor Q26 is connected to the emitter of the transistor Q23, and the collector current of the transistor Q26 is controlled by the output voltage from the detection amplifier 12 for DC feedback, thereby controlling the DC action point of the amplifying circuit 11 for horizontal dynamic focus.

In this constitution, a DC feedback loop is composed for stabilizing the DC action point by the control of the DC control point of the amplifying circuit 11 for horizontal dynamic focus, and delivering without distortion the signal output voltage of superposing the parabolic waveform signal for correction of vertical dynamic focus and the parabolic waveform signal for correction of horizontal dynamic focus.

According to the constitution, the parabolic waveform signal for correction of vertical dynamic focus is added to the DC feedback loop of the amplifying circuit 11 for horizontal dynamic focus, and the parabolic waveform signal for correction of horizontal dynamic focus is superposed in the amplifying circuit 11 for horizontal dynamic focus through the DC control circuit 13, thereby obtaining a parabolic waveform signal for correction of horizontal dynamic focus superposing the parabolic waveform signal for correction of vertical dynamic focus from the output terminal of the amplifying circuit 11 for horizontal dynamic focus. Its output is added to the grid for dynamic focus of the cathode-ray tube.

According to the embodiment, since the parabolic waveform signal for correction of vertical dynamic focus is added at a position of low signal level in the DC feedback loop and the parabolic waveform signal for correction of horizontal dynamic focus is superposed in the amplifying circuit 11 for horizontal dynamic focus through the DC control circuit 13, the amplifying circuit 11 for horizontal dynamic focus functions also as the amplifying circuit for vertical dynamic focus, so that the hitherto required amplifying circuit for vertical dynamic focus is not necessary.

Besides, by adding at a position of low signal voltage level, distortion of waveform as experienced when adding after individually amplifying the parabolic waveform signal for correction of vertical dynamic focus and parabolic waveform signal for correction of horizontal dynamic focus does not occur.

(Embodiment 2)

Figure 3:
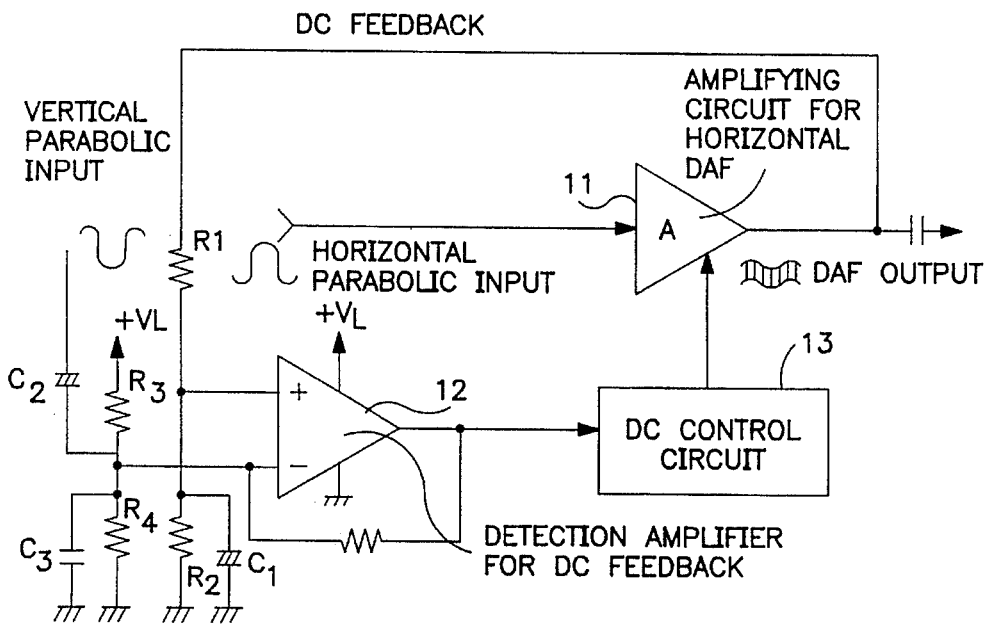
FIG. 3 is a block diagram showing the constitution of an amplifying circuit for dynamic focus in a second embodiment of the invention.
Figure 4:
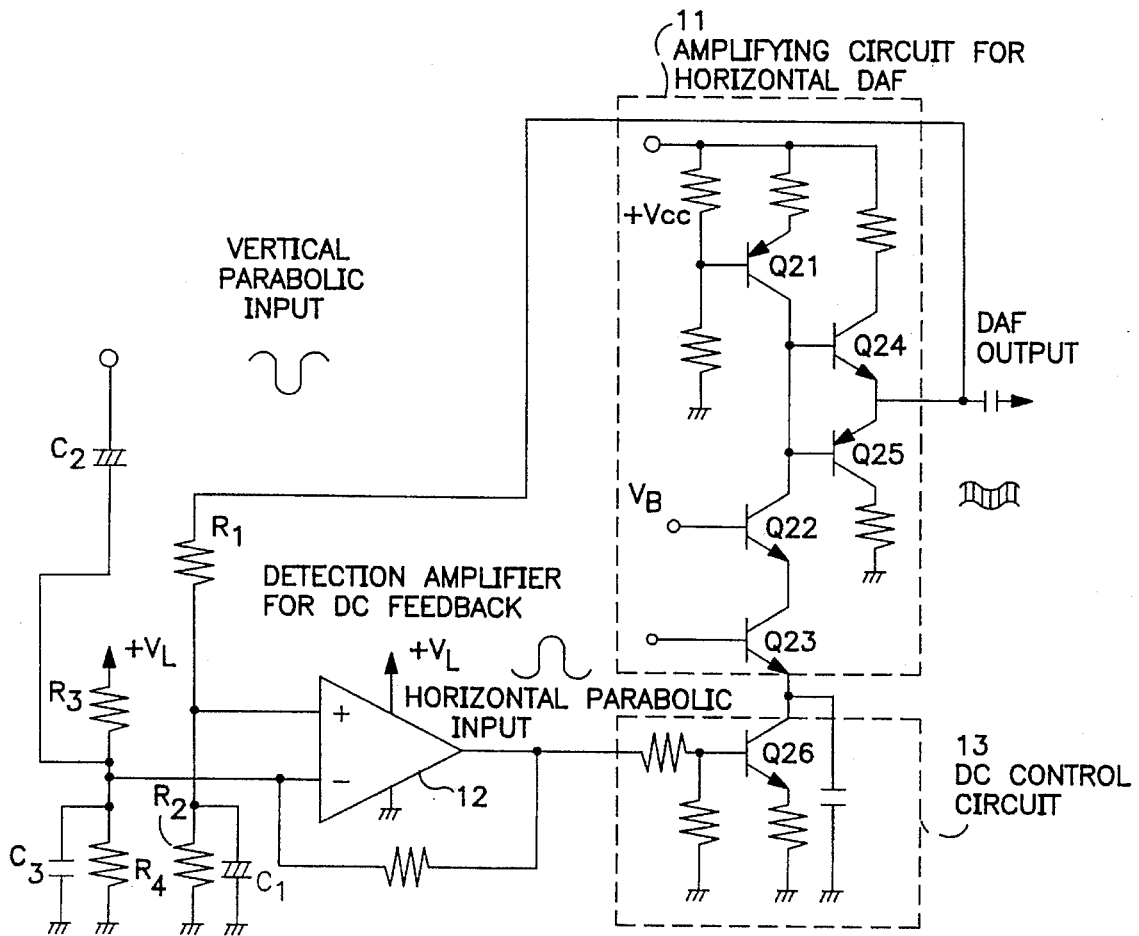
FIG. 4 is a circuit diagram showing a specific circuit constitution of the amplifying circuit for dynamic focus in the second embodiment of the invention.

A second embodiment of the invention is described below while referring to the drawings. FIG. 3 is a block diagram showing the constitution of the second embodiment, and FIG. 4 is a circuit diagram showing a practical circuit thereof. In FIG. 3 and FIG. 4, constituent elements of the same functions as in FIG. 1 and FIG. 2 are identified with same reference numerals, and detailed descriptions are omitted.

What the block diagram in FIG. 3 differs from FIG. 1 is that, in the circuit in FIG. 1, the parabolic waveform signal for correction of vertical dynamic focus is fed into the non-inverting input terminal of the detection amplifier 12 for DC feedback, while, in the circuit in FIG. 3, the parabolic waveform signal for correction of vertical dynamic focus of reverse polarity of FIG. 1 is entered in the inverting input terminal of the detection amplifier 12 for DC feedback.

In this constitution, same as in the case of FIG. 1, the DC action point in the amplifying circuit for horizontal dynamic focus is stabilized, and a parabolic waveform signal for correction of vertical dynamic focus is added to the DC feedback loop of the amplifying circuit 11 for horizontal dynamic focus, and a parabolic waveform signal for correction of horizontal dynamic focus is superposed in the amplifying circuit 11 for horizontal dynamic focus through the DC control circuit 13, thereby obtaining a parabolic waveform signal for correction of horizontal dynamic focus superposing the parabolic waveform signal for correction of vertical dynamic focus from the output terminal of the amplifying circuit 11 for horizontal dynamic focus. Its output is applied to a grid for dynamic focus of a cathode-ray tube.

Referring to FIG. 4, a practical circuit of the second embodiment is described. What the circuit in FIG. 4 differs from the circuit in FIG. 2 is that, in the circuit in FIG. 2, the parabolic waveform signal for correction of vertical dynamic focus is entered in the non-inverting input terminal of the detection amplifier 12 for DC feedback, while, in the circuit in FIG. 4, the parabolic waveform signal for correction of vertical dynamic focus of reverse polarity of FIG. 2 is entered in the inverting input terminal of the detection amplifier 2 for DC feedback.

In this embodiment, same as in the first embodiment, the parabolic waveform signal for correction of vertical dynamic focus is added at a position of low signal level in the DC feedback loop and is superposed on the parabolic waveform signal for correction of horizontal dynamic focus in the amplifying circuit 11 for horizontal dynamic focus through the DC control circuit 13, and therefore the amplifying circuit 11 for horizontal dynamic focus functions also as the amplifying circuit for vertical dynamic focus, and hence the hitherto needed amplifying circuit for vertical dynamic focus is not necessary.

Besides, by adding at a position of low signal voltage level, distortion of waveform as experienced when added after amplifying the parabolic waveform signal for correction of vertical dynamic focus and parabolic waveform signal for correction of horizontal dynamic focus does not occur.

(Embodiment 3)

Figure 5:
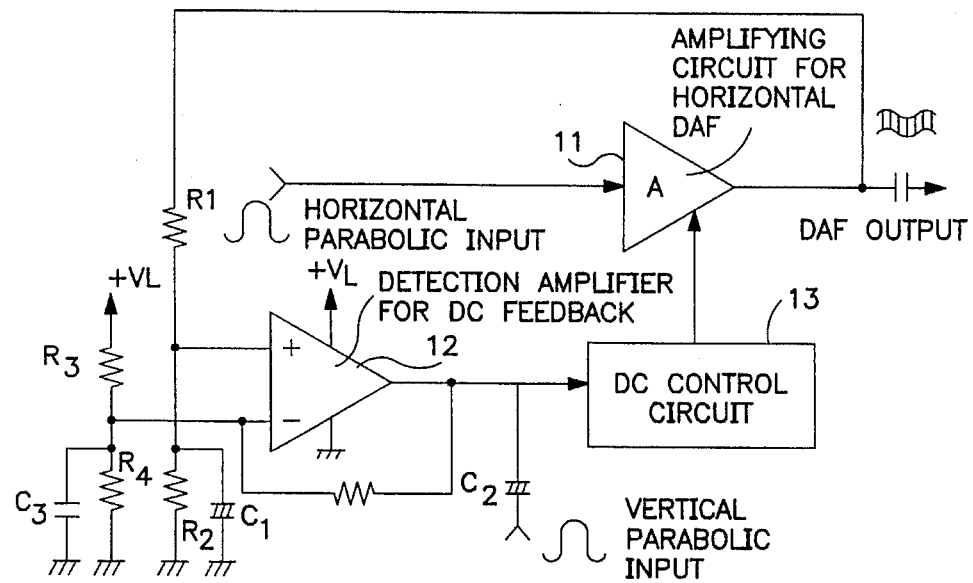
FIG. 5 is a block diagram showing the constitution of an amplifying circuit for dynamic focus in a third embodiment of the invention.

A third embodiment of the invention is described below by reference to the accompanying drawings. FIG. 5 is a block diagram showing a constitution of the third embodiment, and FIG. 6 is a circuit diagram showing a practical circuit thereof in FIG. 5 and FIG. 6, constituent elements of the same functions as in FIG. 1 and FIG. 2 are identified with same reference numerals, and detailed descriptions are omitted.

What the block diagram in FIG. 5 differs from FIG. 1 is that, in the circuit in FIG. 1, the parabolic waveform signal for correction of vertical dynamic focus is fed into the non-inverting input terminal of the detection amplifier 12 for DC feedback, while, in the circuit in FIG. 5 a parabolic waveform signal for correction of vertical dynamic focus of the same polarity as in FIG. 1 is entered in the input terminal of the DC control circuit 13.

In this constitution, same as in FIG. 1, the DC action point is stabilized in the amplifying circuit for horizontal dynamic focus, and a parabolic waveform signal for correction of vertical dynamic focus is added to the DC feedback loop of the amplifying circuit 11 for horizontal dynamic focus, and a parabolic waveform signal for correction of horizontal dynamic focus is superposed in the amplifying circuit 11 for horizontal dynamic focus through the DC control circuit 13, thereby obtaining a parabolic waveform signal for correction of horizontal dynamic focus superposing the parabolic waveform signal for correction of vertical dynamic focus from the output terminal of the amplifying circuit 11 for horizontal dynamic focus. Its output is added to a grid for dynamic focus of a cathode-ray tube.

Figure 6:
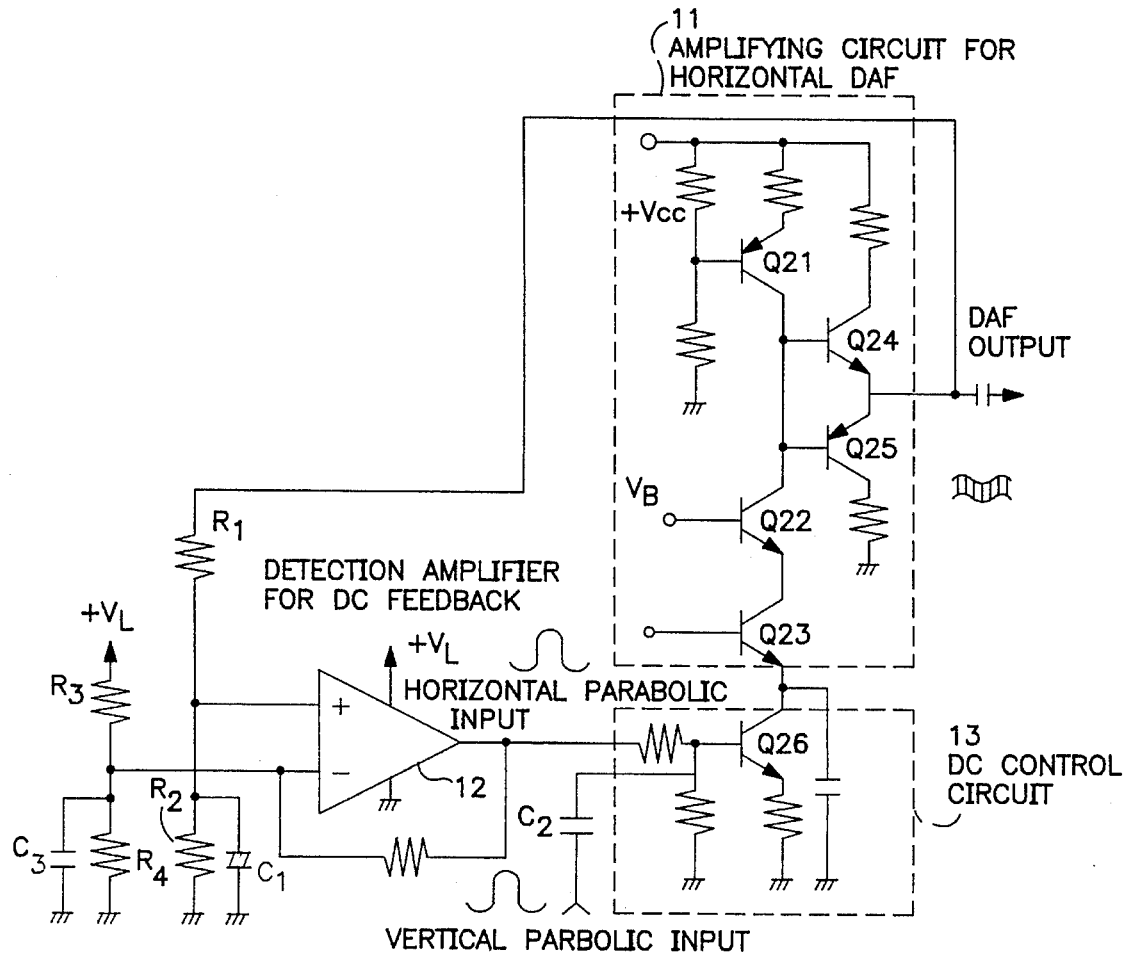
FIG. 6 is a circuit diagram showing a specific circuit constitution of the amplifying circuit for dynamic focus in the third embodiment of the invention.
Figure 7:
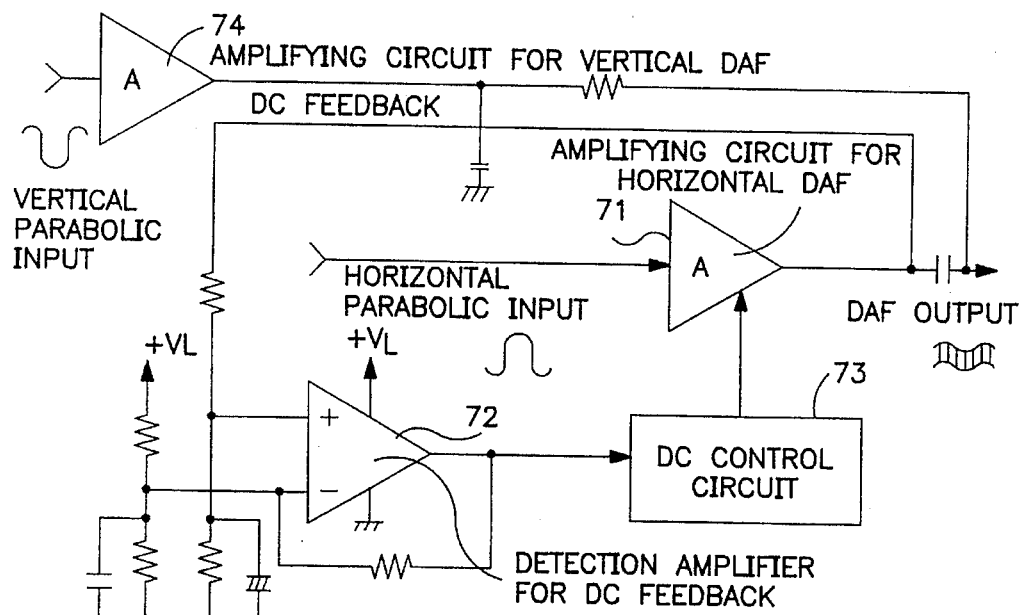
FIG. 7 is a block diagram showing the constitution of an amplifying circuit for dynamic focus in a prior art.
Figure 8:
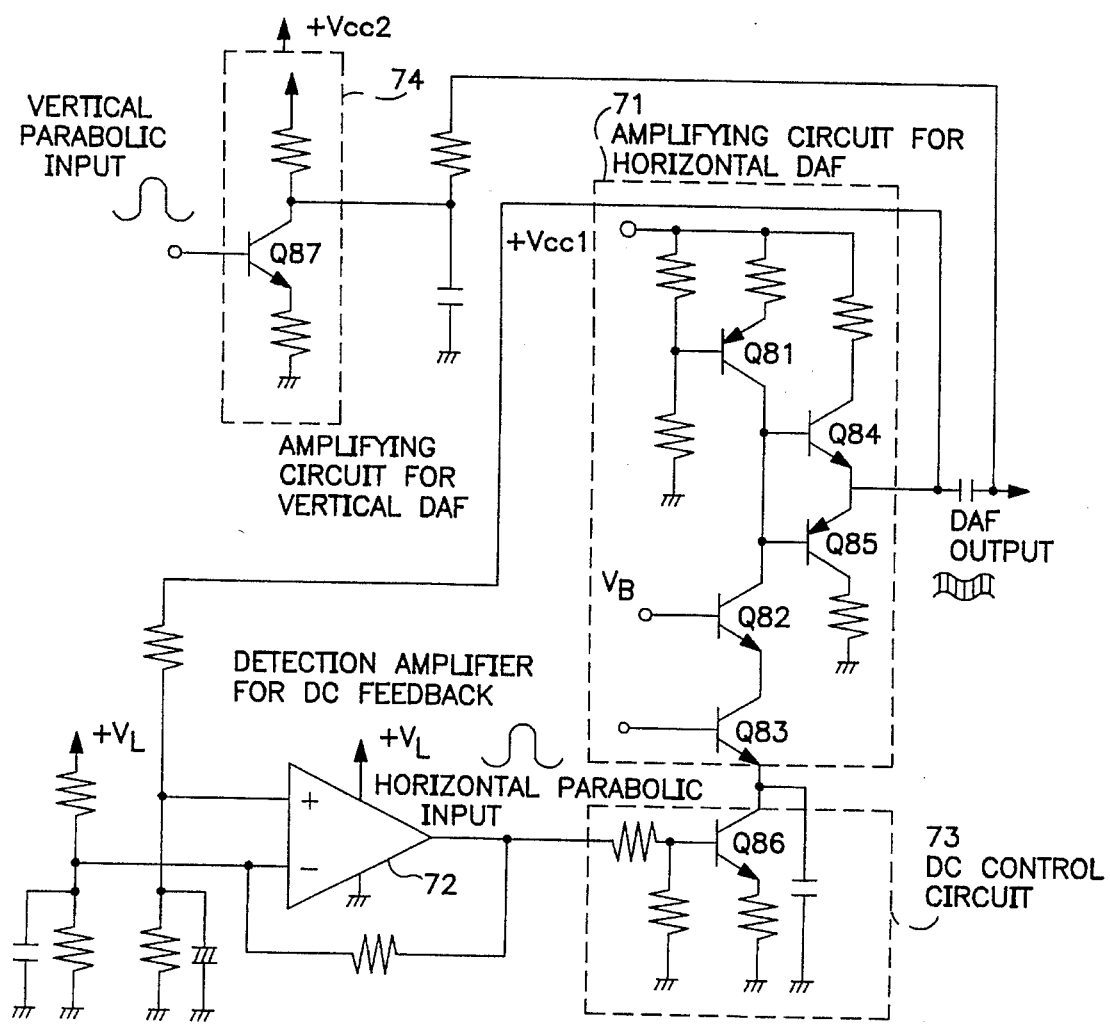
FIG. 8 is a circuit diagram showing a specific circuit constitution of the amplifying circuit for dynamic focus in the prior art.

Referring to FIG. 6, a practical circuit of the third embodiment is described below. What the circuit in FIG. 6 differs from the circuit in FIG. 2 is that, in the circuit in FIG. 2, the parabolic waveform signal for correction of vertical dynamic focus is entered in the non-inverting input terminal of the detection amplifier 12 for DC feedback, while, in the circuit in FIG. 6, a parabolic waveform signal for correction of vertical dynamic focus of the same polarity as in FIG. 2 is entered to the base of the transistor for composing the DC control circuit 13.

According to the embodiment, same as in the first embodiment, the parabolic waveform signal for correction of vertical dynamic focus is added at a position of low signal level in the DC feedback loop, and the parabolic waveform signal for correction of horizontal dynamic focus is superposed in the amplifying circuit 11 for horizontal dynamic focus through the DC control circuit 13, and therefore the amplifying circuit 11 for horizontal dynamic focus functions also as the amplifying circuit for vertical dynamic focus, so that the hitherto required amplifying circuit for vertical dynamic focus is not needed.

Moreover, by adding at a position of low signal voltage level, distortion of waveform as experienced when added after individually amplifying the parabolic waveform signal for correction of vertical dynamic focus and the parabolic waveform signal for correction of horizontal dynamic focus does not occur.

In the foregoing embodiments, the output terminal of the amplifying circuit 11 for horizontal dynamic focus and the application point of parabolic waveform signal for correction of vertical dynamic focus are in reverse phase, and hence improvement of waveform of parabolic waveform signal for correction of vertical dynamic focus by negative feedback can be expected.

As described herein, according to the amplifying circuit for dynamic focus of the invention, by applying a parabolic waveform signal for correction of vertical dynamic focus to the DC feedback loop of the amplifying circuit for horizontal dynamic focus, and superposing on the parabolic waveform signal for correction of horizontal dynamic focus in the amplifying circuit 11 for horizontal dynamic focus through the DC control circuit 13, a parabolic waveform signal for correction of horizontal dynamic focus superposing the parabolic waveform signal for correction of vertical dynamic focus is obtained from the output terminal of the amplifying circuit for horizontal dynamic focus. Therefore, the amplifying circuit for vertical dynamic focus required in the prior art is not needed, so that the circuit may be simplified. It is therefore free from distortion of waveform which is experienced in the prior art when adding after individually amplifying the parabolic waveform signal for correction of horizontal dynamic focus and parabolic waveform signal for correction of vertical dynamic focus, so that the distortion may be lower than in the prior art.

To represent the parabolic waveform signals for correction of horizontal and vertical dynamic focus shown, one waveform each is shown schematically in the drawings, but actually, needless to say, the period of the parabolic waveform signal for correction of vertical dynamic focus is extremely longer than that of the parabolic waveform signal for correction of horizontal dynamic focus.

The invention may be therefore embodied otherwise by modifying the detail within the scope of the claims herein. For example, in FIG. 2, FIG. 4 and FIG. 6, the transistor Q21 may be replaced by a resistor if the stability may be somewhat sacrificed.

What is claimed:

1. A dynamic focus correction circuit comprising:

an amplifying circuit for receiving and amplifying a parabolic waveform signal for horizontal dynamic focus, and delivering the amplified parabolic waveform signal to a grid for dynamic focus of a cathode-ray tube, a detection amplifier for DC feedback for dividing the output of the amplifying circuit at a dividing point by using resistors, filtering a horizontal parabolic waveform signal component through a first capacitor connected between the dividing point and a ground, and amplifying a differential voltage between (i) the voltage at the dividing point added to a parabolic waveform signal for vertical dynamic focus coupled to the dividing point through a second capacitor, and (ii) a specific voltage, and a DC control circuit for controlling a DC action point of the amplifying circuit by receiving the output voltage of the detection amplifier for DC feedback.

2. A dynamic focus correction circuit comprising:

an amplifying circuit for receiving and amplifying a parabolic waveform signal for horizontal dynamic focus, and delivering the amplified parabolic waveform signal to a grid for dynamic focus of a cathode-ray tube, a detection amplifier for DC feedback for dividing the output of the amplifying circuit at a dividing point by using resistors, filtering a horizontal parabolic waveform signal component through a first capacitor connected between the dividing point and a ground, and amplifying a differential voltage between (i) a voltage obtained by adding a parabolic waveform signal for vertical dynamic focus to a specific DC voltage, and (ii) the voltage at said dividing point, and a DC control circuit for controlling a DC action point of the amplifying circuit by receiving the output voltage of the detection amplifier for DC feedback.

3. A dynamic focus correction circuit comprising:

an amplifying circuit for receiving and amplifying a parabolic waveform signal for horizontal dynamic focus, and delivering the amplified parabolic waveform signal to a grid for dynamic focus of a cathode-ray tube, a detection amplifier for DC feedback for dividing the output of the amplifying circuit at a dividing point by using resistors, filtering a horizontal parabolic waveform signal component through a first capacitor connected between the dividing point and a ground, and amplifying a differential voltage between (i) the voltage at said dividing point and (ii) a specified DC voltage, and a DC control circuit for adding a parabolic waveform signal for correction of vertical dynamic focus to the output voltage of the detection amplifier for DC feedback through a second capacitor and controlling a DC action point of the amplifying circuit for horizontal dynamic focus.

4. A dynamic focus correction circuit of claim 1, wherein a component of the parabolic waveform signal for vertical dynamic focus in the output signal of the amplifying circuit and a component of the parabolic waveform signal for vertical dynamic focus in the input signal added to the input terminal of the detection amplifier for DC feedback are in reverse phase.

5. A dynamic focus correction circuit of claim 2, wherein a component of the parabolic waveform signal for vertical dynamic focus in the output signal of the amplifying circuit and a component of the parabolic waveform signal for vertical dynamic focus in the input signal added to the input terminal of the detection amplifier for DC feedback are in reverse phase.

6. A dynamic focus correction circuit of claim 3, wherein a component of the parabolic waveform signal for vertical dynamic focus in the output signal of the amplifying circuit and a component of the parabolic waveform signal for vertical dynamic focus in the input signal added to the input terminal of the detection amplifier for DC feedback are in reverse phase.

* * * * *